Sept. 16, 1958 S. D. RIZA 2,852,036
DISCHARGE VALVE FOR FEED MIXER
Filed Feb. 23, 1956

INVENTOR
Samuel D. Riza

BY Ashley & Ashley

ATTORNEYS

United States Patent Office

2,852,036
Patented Sept. 16, 1958

2,852,036

DISCHARGE VALVE FOR FEED MIXER

Samuel D. Riza, Cleburne, Tex., assignor to Riza Manufacturing Company, Inc., Cleburne, Tex., a corporation of Texas Application February 23, 1956, Serial No. 567,272

1 Claim. (Cl. 137—315)

This invention relates to new and useful improvements in discharge valves for feed mixers.

One object of the invention is to provide an improved discharge valve for a feed mixer having a pair of coacting closure members and common means for resisting opening movement of the closure members so that said members cannot become unbalanced.

Another object of the invention is to provide an improved discharge valve for a feed mixing chamber of the conveyor type which includes a pair of valve gates pivotally mounted in coacting relationship at the discharge end of the chamber and common spring means having connection with the valve gates for resisting opening movement thereof whereby the same amount of pressure is required to open either or both of said valve gates.

A further object of the invention is to provide an improved discharge valve, of the character described, which includes levers connected to the valve gates and pivotally connected by a link to each other and to a spring for resisting movement of the link and levers whereby a predetermined force is required to open either or both of said valve gates.

A construction designed to carry out the invention will be hereinafter described together with other features of the invention.

Figures 1, 2:
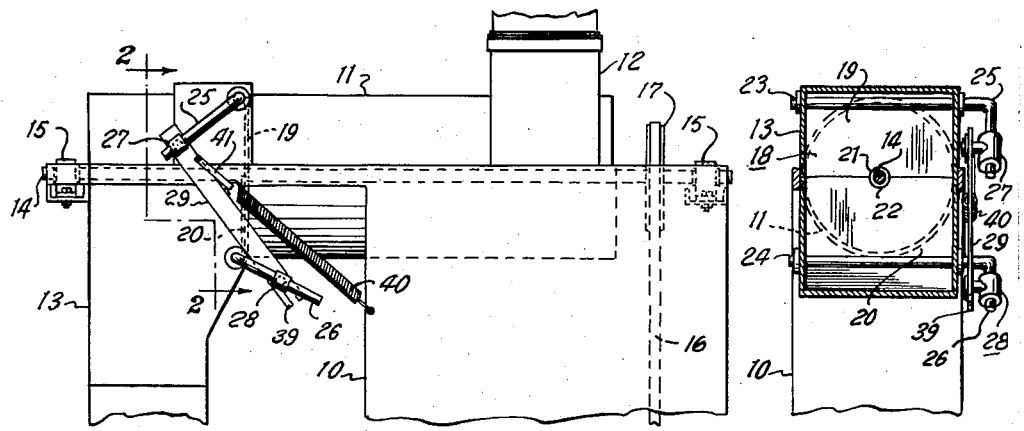
Figures 3, 4:
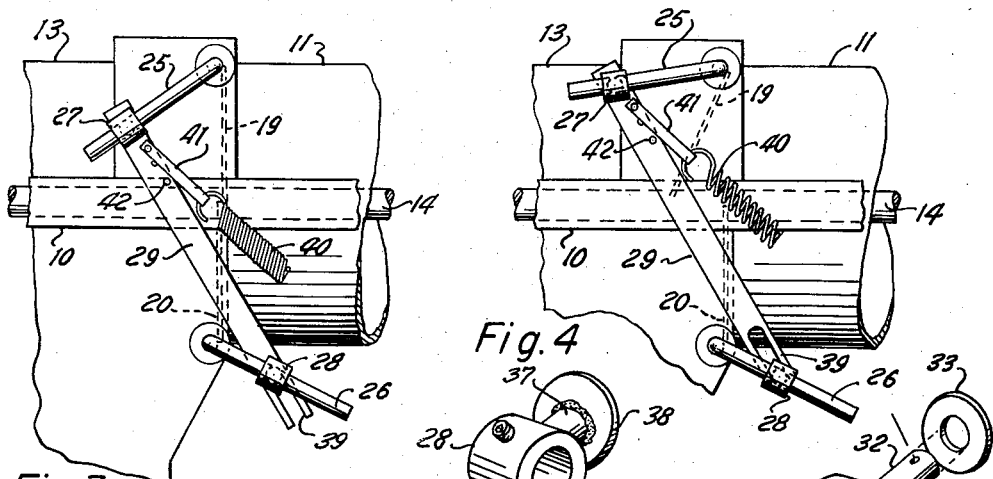
Figure 5:
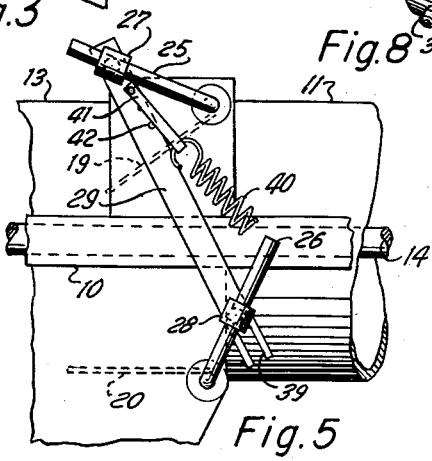
Figure 6:
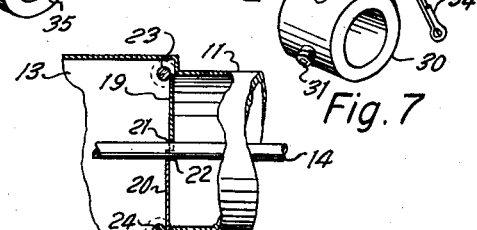

The invention will be more readily understood from a reading of the following specification and by reference to the accompanying drawing, wherein an example of the invention is shown, and wherein:

Fig. 1 is a side elevational view of a portion of a feed mixer having a discharge valve constructed in accordance with the invention, Fig. 2 is a transverse, vertical, sectional view, taken on the line 2—2 of Fig. 1, Fig. 3 is an enlarged side elevational view, Fig. 4 is a view, similar to Fig. 3, showing the upper valve gate partly opened, Fig. 5 is a view, similar to Fig. 3, showing both valve gates opened, Fig. 6 is a view, partly in elevation and partly in section, showing the valve gates closed, Figs. 7 and 8 are enlarged perspective views of the pivotal connectors for the levers of the valve gates.

In the drawing, the numeral 10 designates the frame of a feed mixer which is preferably of the sweet feed type wherein molasses is mixed with grain or other cattle feed. A substantially horizontal cylindrical mixing chamber 11 is supported by the frame 10 and extends laterally thereof with an overlying hopper 12 communicating with its inner end and a discharge chute 13 communicating with and depending from its outer end. The mixing chamber 11 is of the conveyor type shown in United States Letters Patent No. 2,164,257, issued June 27, 1939, and is adapted to convey cattle feed from the hopper 12 to the discharge chute 13. Although the conveyor is not shown, its shaft 14 extends axially through the mixing chamber and through the upper portion of the discharge chute and has its ends journaled in bearings 15 mounted on the frame. A suitable belt 16 and pulley 17 are provided for driving the conveyor shaft 14 in the usual manner.

For closing the outer end of the mixing chamber 11 so as to retain the cattle feed therein until the molasses is thoroughly admixed therewith, a discharge valve 18 is provided as most clearly shown in Figs. 2 and 6. The discharge valve includes a pair of upper and lower upright closure members 19 and 20 in the form of rectangular valve gates or plates overlying the outer end of the mixing chamber in superimposed, coacting relationship and having semi-circular recesses 21 and 22 for accommodating the shaft 14. Preferably, the upper valve gate 19 is offset inwardly of the lower valve gate 20 (Fig. 6).

A pair of angular shafts or levers 23 and 24 extend transversely of the discharge chute 13 above and below the mixing chamber and have their ends extending through and suitably journaled in opposed walls of said chute for pivotally supporting the valve gates. The levers 23 and 24 have angularly-directed arms 25 and 26, respectively, formed on one of their ends and adapted to be pivotally connected by pivotal connectors 27 and 28 and a connecting element or link 29. As shown most clearly in Fig. 7, the pivotal connector 27 includes a collar 30 slidably mounted on the arm of the lever and adapted to be adjustably fixed thereto by one or more set screws 31. A pivot pin 32 extends radially from the collar 30 for engagement with a suitable opening (not shown) formed in the upper end of the link 29 and is adapted to be confined therein by a washer 33 and cotter pin 34. The connector 28 is similar and includes a similar collar 35, one or more set screws 36 and radial pivot pin 37. A circular plate or washer 38 is secured to the outer end of the pivot pin 37 which engages in an open-end slot 39 formed in the lower end of the link. A helical spring 40 has one end connected to the frame 10 and its opposite end pivotally connected to the upper portion of the link by a strap 41 for resisting movement of the levers and link and opening of the valve gates 19 and 20. In order to permit adjustment of the tension of the spring 40, a plurality of openings 42 are formed in the link 29 for connection with the strap 41.

Due to the open-end slot 39, the link 29 and upper lever 23 may move relative to the lower lever 24 as shown in Fig. 4. It is noted, however, that the purpose of the slot is to facilitate connection and disconnection between the link and levers and that said slot could be a simple opening if disconnection is not desired. Since the valve gates are opened by the force or pressure of the compressed feed, the lower gate is exposed to the same or greater force than the upper gate and is opened at the same time as said upper gate due to the pivotal connection provided by the link 29. The force of the spring 40 constantly resists opening of the valve gates and the same amount of pressure or force is required to open either or both valve gates since the spring is common thereto. In other words, the resisting force remains the same irrespective of whether the opening pressure is applied to one or both valve gates. As a result, the valve gates cannot become unbalanced and the same will be opened substantially simultaneously.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

In a feed mixer having a discharge outlet, a discharge valve cooperating with said outlet including a pair of valve gates pivotally mounted in coacting relationship at the discharge outlet, a lever connected to each valve gate, a link having pivotal connection with the levers, a spring having connection with the link for resisting movement of said link and levers and opening of the valve gates, said link having an open-end slot at one end thereof and the pivotal connection between one of said levers and said link includes a pivot pin extending through said open-end slot and being slidable therein, and means for detachably securing said pin on said lever for removal therefrom and from said open-end slot and so that said pin cannot slide out of said open-end slot when said valves are moved from their fully closed to their fully opened position.

References Cited in the file of this patent

UNITED STATES PATENTS

| | | |
|---|---|---|
| 1,071,600 | Balg | Aug. 26, 1913 |
| 2,339,378 | Clench | Jan. 18, 1944 |

FOREIGN PATENTS

| | | |
|---|---|---|
| 1,726 | Great Britain | Feb. 3, 1916 |